United States Patent
Bilhan et al.

(10) Patent No.: US 6,829,007 B1
(45) Date of Patent: Dec. 7, 2004

(54) DIGITAL SCHEME FOR NOISE FILTERING OF OPTICAL BLACK AND OFFSET CORRECTION IN CCD SIGNAL PROCESSING

(75) Inventors: Haydar Bilhan, Dallas, TX (US); Ramesh Chandrasekaran, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 876 days.

(21) Appl. No.: 09/651,208

(22) Filed: Aug. 30, 2000

Related U.S. Application Data (60) Provisional application No. 60/152,439, filed on Sep. 3, 1999.

(51) Int. Cl.[7] ............................................. H04N 5/217
(52) U.S. Cl. ....................................... 348/243; 348/241
(58) Field of Search .............................. 348/222.1, 241, 348/243, 244, 245, 248, 249, 251, 294, 311, 315, 695; 371/572, 37.01

(56) References Cited

U.S. PATENT DOCUMENTS

| | | | |
|---|---|---|---|
| 5,642,162 A | * 6/1997 | Maki et al. ................. | 348/241 |
| 5,708,482 A | * 1/1998 | Takahashi et al. .......... | 348/695 |
| 5,841,793 A | * 11/1998 | Fukuda ....................... | 714/752 |
| 6,005,615 A | 12/1999 | Tsuda | |
| 6,049,355 A | 4/2000 | Kameyama | |
| 6,084,634 A | * 7/2000 | Inagaki et al. .............. | 348/294 |
| 6,304,292 B1 | * 10/2001 | Ide et al. .................... | 348/243 |

* cited by examiner

*Primary Examiner*—Tuan Ho
(74) *Attorney, Agent, or Firm*—April M. Mosby; Wade James Brady, III; Frederick J. Telecky, Jr.

(57) ABSTRACT

An image processing apparatus (800) for a charge coupled device having hot/cold pixel and line noise filtering is disclosed which provides optical black and offset correction. The present invention teaches an offset and optical black correction circuit having a digital filter to obtain noise-free optical black correction for charge-coupled devices such that a digitally programmable bandwidth exists. The sum of the channel offset and optical black level is averaged for a given number of lines having a number of optical black cells per line and this sum passes through a digital filter. Moreover, the channel is digitally calibrated to obtain a user programmed ADC (810) output which corresponds to that average.

11 Claims, 8 Drawing Sheets

DIGITAL SCHEME FOR NOISE FILTERING OF OPTICAL BLACK AND OFFSET CORRECTION IN CCD SIGNAL PROCESSING

CROSS-REFERENCE TO RELATED APPLICATION

The present invention relates to a copending application entitled "Optical Black and Offset Correction in CCD Signal Processing," Ser. No. 09/353,919, filed on Jul. 15, 1999, which is incorporated by reference herein. This application claims priority under 35 USC § 119(e)(1) of provisional application No. 60/152,439, filed Sep. 3, 1999.

FIELD OF THE INVENTION

The present invention relates to image processing, and, more particularly, to an analog front end for a charge coupled device, which provides digital optical black and offset correction and noise filtering.

BACKGROUND OF THE INVENTION

Great strides in integrated circuit design and manufacturing have enabled low cost, highly integrated, high performance image processing products, including the digital electronic cameras. A conventional camera comprises an image sensor, typically an array charge coupled device (CCD), an analog front end (AFE) and a digital image processor. Most analog front ends having optical black and offset calibration include schemes that integrate the error signal on a capacitor during an optical black period and feed back the voltage generated to the input to cancel the offset or the optical black value during the video interval.

Figure 1:
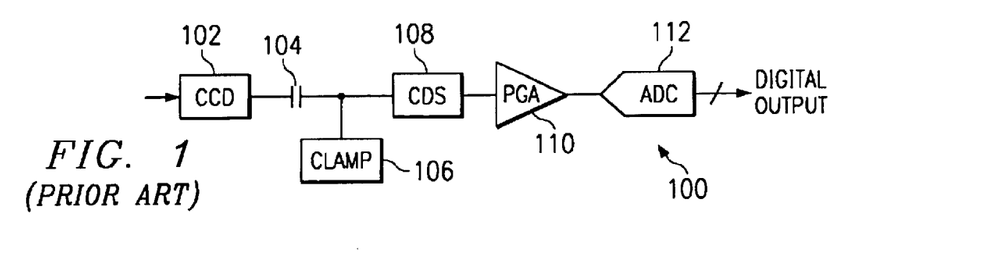
FIG. 1 is a block diagram of a known embodiment of an analog front end for a CCD.

As shown in circuit 100 of FIG. 1, the CCD 102, an integrated array of photocells used in digital imaging, is connected to a capacitor 104 and a clamp circuit 106 for AC coupling. The AFE connected to the capacitor 104 generally includes three main elements: a correlated double sampler 108 (CDS), a programmable gain amplifier 110 (PGA), and an analog to digital converter 112 (ADC). The fundamental goal in any camera design is to extract as much dynamic range from the image sensor without adding any noise with the subsequent circuitry.

Figure 2A:
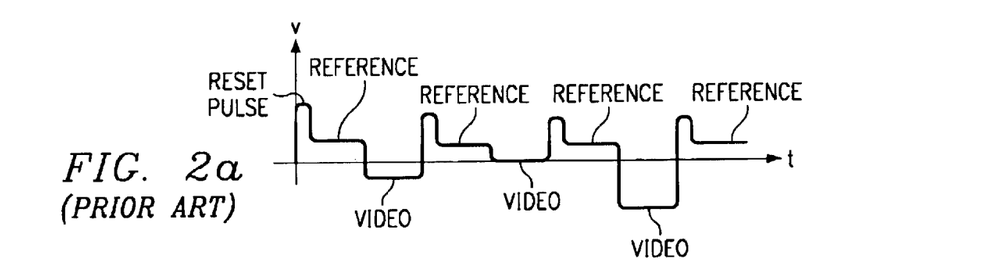
FIGS. 2a and 2b are waveforms useful in understanding the circuit of FIG. 1.
Figure 2B:
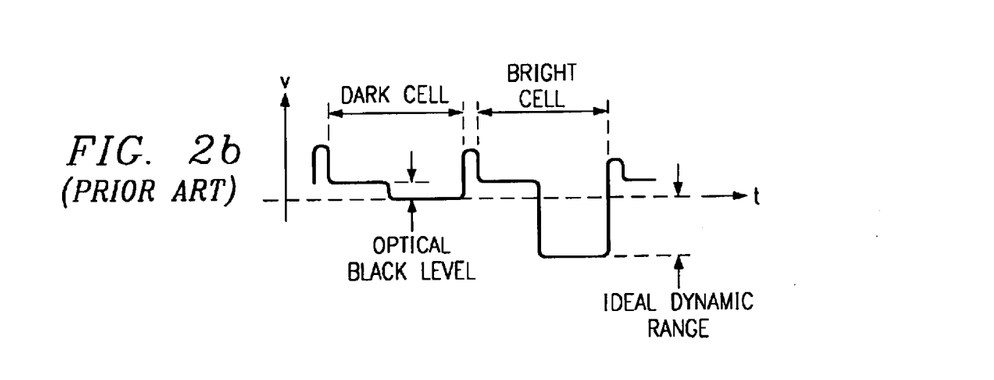

The specific operation of the conventional image process apparatus 100 with such a construction is described referring to the timing charts of CCD 102 output in FIGS. 2a and 2b. Particularly, the output of the CCD 102 contains a reset pulse, the reference level and the video level. Output from the CCD 102 is sampled twice by CDS 108 such that the first sample is taken during the reference level and the second sample is taken during the video signal. The difference is the corresponding CDS 108 output. This difference between the optical black level and the video level represents the actual image value for any given pixel.

As shown in FIG. 2b, a dark cell does not produce a zero differential output, due to the dark currents of the photocells, which may vary from pixel to pixel and line to line in a frame. Due to the dark current or "optical black level" and the internal offsets of all amplifiers used in the CDS 108, PGA 110 and ADC 112, the resulting ADC 112 output for a dark cell will not be zero. Further complicating the matter, the CDS 108 offset and the optical black level are multiplied by the gain from the PGA 110. In order to achieve the ideal dynamic range for the signal, the black level and the offsets must be removed.

The function of the CDS 108, as illustrated in FIGS. 2a and 2b, is to sense and produce a voltage difference between the reference level and the video level of each pixel. The most important benefit of using CDS 108 is to reduce noise. In addition to the capturing of the video data by subtracting the reference levels from the video levels, any noise common to these two signals are removed by the CDS 108.

One approach for canceling an offset in switched capacitor amplifiers is to put the amplifier in unity gain feedback during the sampling phase. This way the input offset is also sampled and canceled during the amplification phase. For applications, however, where high speed and high closed loop gain are required, stable amplifiers at unity gain feedback can not be maintained. In addition, this approach will not correct the optical black level.

Figure 3:
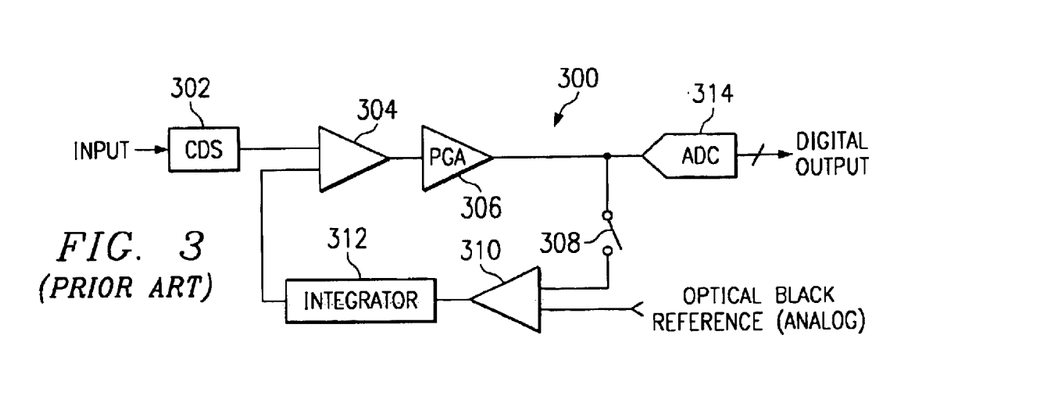
FIG. 3 illustrates a known embodiment of an optical black calibration system using an integrator.

Another approach corrects the optical black level using the feedback circuit 300 displayed in FIG. 3. It integrates the optical black error on an integrator and applies a negative feedback to the input of the PGA 306. The feedback circuit operates to control the level of the analog optical black signal to a predetermined level.

This technique, however, lacks the flexibility of digital programmability and requires analog circuit complexity, sometimes even off-chip capacitors. It is also not suitable for discrete time (switched capacitor) systems because of the latency at the amplifier outputs. In the alternative, however, post digital optical black correction techniques is not desired, since it is better to cancel the offset in analog domain for an optimum dynamic range.

Figure 4:
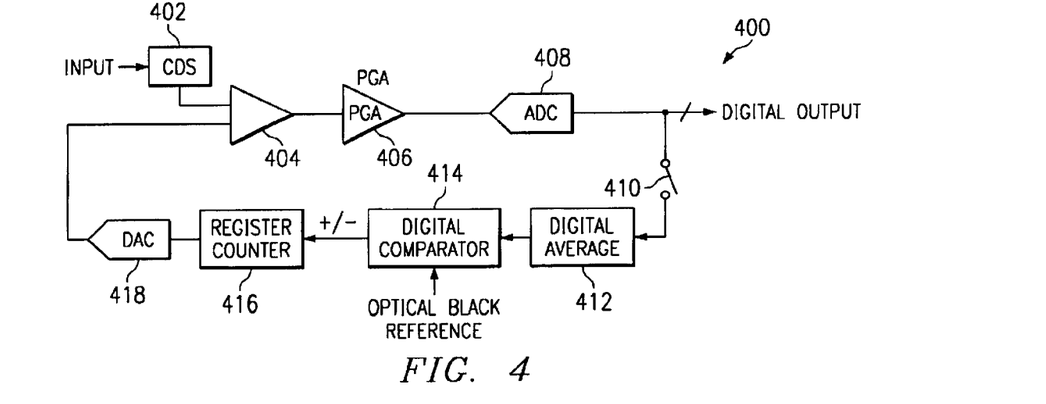
FIG. 4 illustrates a first embodiment of an optical black calibration system as disclosed in the co-pending application Ser. No. 09/353,919.
Figure 5:
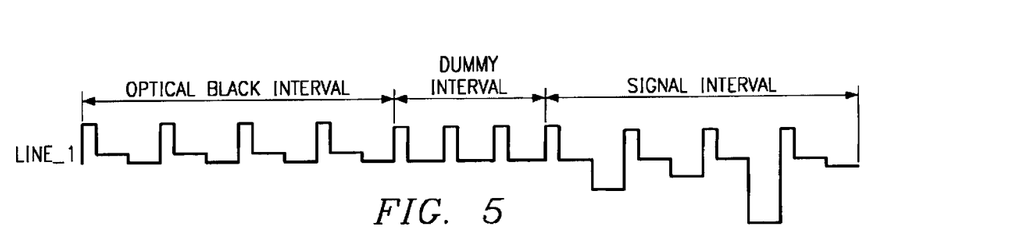
FIG. 5 is a waveform illustrating a CCD output frame with an optical black interval and a signal interval.

Our copending application Ser. No. 09/353,919, as shown in FIG. 4, provides a CCD signal processing method that provides optical black offset correction using a moving average filter scheme such that the optical black pixels are averaged at the beginning of each line and offset DAC, 418, are updated in order to cancel the offset. The analog front end (AFE) converts the CCD output signal to digital data to allow subsequent digital signal processing. At the input of the AFE, the DC level of the CCD output signal is clamped to the input dynamic range. For better noise performance and dynamic range, correlated double sampling is applied to the clamped input signal. The output of correlated double sampler (CDS) is amplified by a programmable gain that varies exponentially with linear control. Then the amplified analog signal is converted to digital data. The optical black value and channel offset are corrected in order to maximize the dynamic range.

Using a feedback loop having a switch 410 that closes during optical black level sampling of the signal, a digital averager 412 averages the optical black pixels. A comparator 414 compares the desired optical black level with the averaged optical black level. It provides an up and down control signal to the up/down counter 416. Counter/register 416 counts up or down until the output of the ADC 408 converges to the desired optical black level. Digital-to-analog converter 418 converts the output of the counter into an analog voltage to be applied to the image signal output from CDS 402. This circuit arrangement, however, will take an unknown repetition of feedback lines to cancel the optical black level offset. Also, if the PGA gain is too high, the accuracy of the cancellation may be poor.

Figure 6:
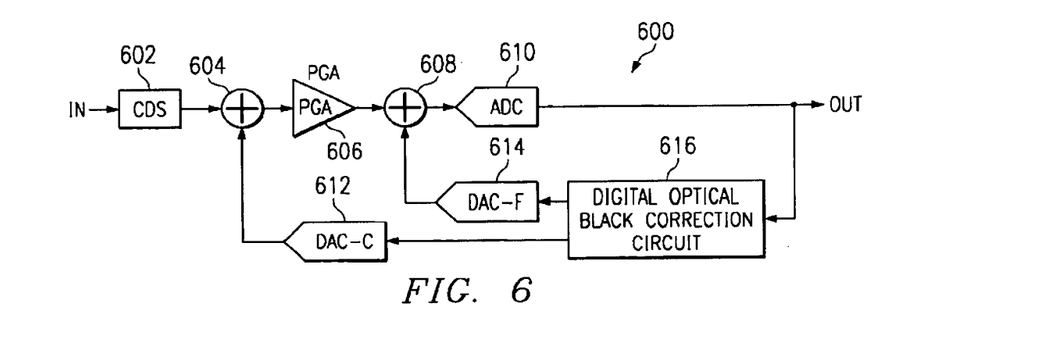
FIG. 6 is a block diagram of a second embodiment of the optical black offset correction apparatus as disclosed in the co-pending application, Ser. No. 09/353,919.

The second embodiment in our copending application Ser. No. 09/353,919, provides a CCD signal processing method that provides optical black offset correction using a moving average filter scheme such that the optical black pixels are averaged at the beginning of each line and offset DACs, DAC-C 612 and DAC-F 614, are updated in order to cancel the offset. Specifically, as shown in FIG. 6, circuit 600 includes a mixed signal technique that corrects the offset and optical black value in the analog domain using a coarse and fine adjustment mode. Digital optical black correction circuit 616 determines the necessary amount that the analog offset of the image signal should be adjusted. DAC-C 612 and DAC-F 614 provide offsets in the coarse and fine adjustment modes, respectively. This highly programmable technique can be used both in discrete and continuous time systems and does not require any off-chip components.

Figure 7:
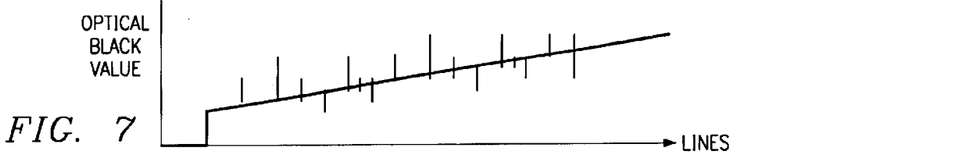
FIG. 7 is a waveform illustrating a typical optical black value for a frame or a field.

In operation, CCD image lines are shifted vertically to a line register, then the pixels on this line are shifted horizontally to an output pin. This process causes a gradual increase in the optical black value within the frame, which needs to be corrected. As shown in FIG. 7, there may be an initial jump in the optical black value for the first line of the image frame or field. This jump is caused by different exposure times. Afterwards there is a gradual increase in the average value. In addition to the slow ramp due to the shift in the optical black value during the image read mode, line noise exists as shown; thus, if correction DACs are updated every line, there will be line noise. If DAC updates are conducted over a fixed number of user programmable lines, then there may be visible bands on the image. Moreover, the average differs from line to line since some of the optical black pixels may be defective, i.e. hot and cold optical black pixels. A hot pixel is a defective pixel that generates too much charge, and a cold pixel is the one that does not generate any charge.

There exists a need for a moving average filter scheme for CCD optical black correction to remove line noise and hot and cold pixels without creating bands on the image, wherein straightforward moving average filter can be used, or a simplified version can be used in order to save significant amount of registers and complex digital circuits.

SUMMARY OF THE INVENTION

To address the above-discussed deficiencies of the analog front end circuitry having optical black and offset correction, the present invention teaches an offset and optical black correction circuit having a digital filter to obtain noise-free optical black correction for charge-coupled devices such that a digitally programmable bandwidth exists. In accordance with the present invention, the sum of the channel offset and optical black level present at the output of the ADC as a digital error signal with high frequency noise components passes through hot/cold pixel filtering and is averaged for a given number of lines and optical black cells per line. Finally, it passes through a digital filter with programmable bandwidth to generate a filtered digital error signal. This error signal is fed back to the analog channel through digital to analog conversion in order to obtain the desired optical black level at the output of the ADC.

A first embodiment of the image processing apparatus in accordance with the present invention includes an analog front end circuit connected between the CCD and the optical black and offset correction circuit. The apparatus includes a sampling circuit for sampling the incoming image signal and a detecting circuit for detecting the optical black level. A digital averager averages the optical black pixels at the beginning of each line of the image signal. In addition, the digital averager includes a first filter for filtering hot and cold pixels prior to averaging the optical black pixels. A line noise filter receives the averaged optical black signal and, further, removes line noise from the optical black signal. A digital comparator receives a reference signal and the optical black signal to compare the optical black signal with the reference signal. The difference is received by a correction circuit for correcting the optical black level by feeding back the difference obtained by the digital comparator such that the difference is applied to the analog image signal. Within the present embodiment, the correction circuit includes a digital-to-analog converter that converts the difference back to an analog signal to be applied as an adjustment to the analog image signal at the input of the image processing apparatus.

In a second embodiment, the correction circuit includes a first and a second digital-to-analog converter, used to apply a coarse and fine adjustment to the image signal at differing points in the image processing. As known, the AFE generally includes three main elements: a correlated double sampler (CDS), a programmable gain amplifier (PGA) and an analog-to-digital converter (ADC). The coarse adjustment would first be applied to the image signal before to the PGA and the fine adjustment would be applied to the amplified image signal after the PGA. This embodiment increases the accuracy when the gain of the PGA is high.

Advantages of this design include but are not limited to an analog front end circuit having mixed signal optical black and offset circuitry that is highly programmable which eliminates line noise and cold/hot pixels. This circuit has an improved dynamic range for image processing over other approaches. As such, this highly programmable design can be used both in discrete and continuous time systems and does not require any off-chip components. Thus, this design meets the goal of extracting as much analog dynamic range from the image sensor without adding any noise with the subsequent circuitry.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF PREFERRED EMBODIMENTS

Figure 8:
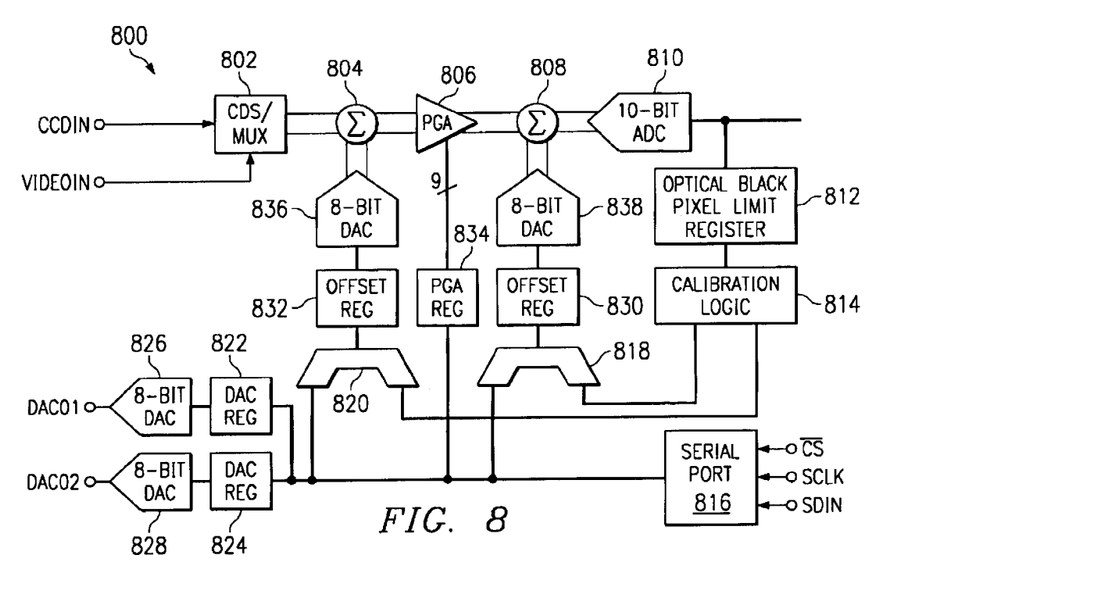
FIG. 8 illustrates an architecture for providing optical black and offset calibration and removing noise in accordance with the present invention.

In accordance with the present invention, FIG. 8 illustrates an embodiment of the analog front end circuit having optical black and offset correction in CCD signal processing wherein hot and cold pixels along with line noise are filtered out. Circuit 800 provides a CCD signal processing method having optical black offset correction using a moving average filter scheme such that hot and cold pixels are filtered out along with line noise in optical black pixels averaged at the beginning of each line. The offset DACs are updated in order to cancel the offset. The optical black level and the amplification are fully customizable by the user.

In operation, the analog front end (AFE) 800 converts the CCD output signal, CCDIN, to digital data to allow subsequent digital signal processing. At the input of the AFE 800, the DC level of the CCD output signal, CCDIN, is clamped to the input dynamic range. For better noise performance and dynamic range, correlated double sampling is applied to the clamped input signal. The output of correlated double sampler (CDS) 802 is amplified by a programmable gain that varies exponentially with linear control. Then the amplified analog signal is converted to digital data.

Within the calibration logic 814, hot and cold pixels along with line noise are removed from the optical black data. The sum of the channel offset and optical black level is averaged for a given number of lines and optical black cells per line. This is compared to a user customizable digital reference and the difference is subjected to digital filtering to remove line noise. The resulting correction signal is converted to an analog value and applied to the analog channel to obtain the user programmer optical black value.

More specifically, analog front end circuit 800 includes a correlated double sampler (CDS) 802 coupled to a first summer 804 for the purpose of adding a first adjustment to the image signal from the CCD, such adjustment is typically coarse, if the subsequent gain is high. A programmable gain amplifier (PGA) 806 couples to amplify the summed signal. A second summer 808 connects to the output of PGA 806 to apply an additional adjustment, typically a fine adjustment to the image signal. It should be noted that given this arrangement of having two separate adjustments, one preceding and one succeeding amplification, the processing of the signal is more reliable than having only one adjustment prior to amplification, since the coarse DAC provides large dynamic correction range and the fine DAC provides fine accuracy.

An ADC 810 receives the output from second summer 808 to convert the analog image signal into a digital one. The optical black pixel limit block 812, is used to limit the hot and cold optical black pixels. These limits are user programmable. A calibration logic 814 includes a digital averager (not shown) and a comparator (not shown). The digital averager averages the optical black pixels at the beginning of each line and the comparator compares the signal to an optical black reference to determine the amount of adjustment needed. In addition, calibration logic 814 includes a filter apparatus as is explained in more detail with reference to FIG. 9 that removes line noise. Circuit 800 provides optical black offset correction using a moving average filter scheme such that the optical black pixels are averaged at the beginning of each line and offset DACs, DAC 836 and DAC 838, are updated in order to cancel the offset. Specifically, DACs 836 and 838 convert the difference into an analog voltage to be applied to the image signal before and after PGA 806, respectively.

The digital block including optical black pixel register 812, calibration logic 814, multiplexers, 818 and 828, and offset registers, 830 and 832, takes the average of the ADC outputs for optical black level, and controls two DACs, 838 and 836, in order to compensate for the channel offset and optical black correction. The DAC 836 before PGA 806 is used to correct the coarse offset and the DAC 838 before ADC 810 is used for fine offset correction.

Figure 11:
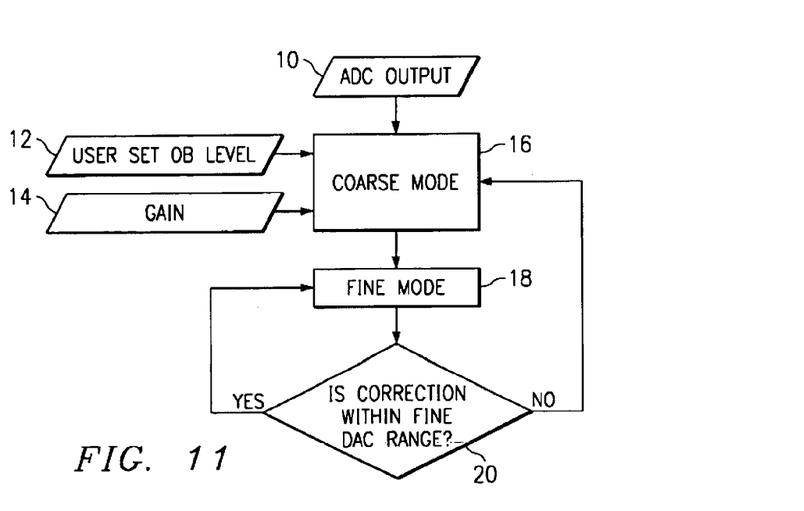
FIG. 11 is a flow chart for the coarse and fine adjustment mode of the optical black offset correction apparatus as disclosed in the co-pending application Ser. No. 09/353,919.
Figure 12:
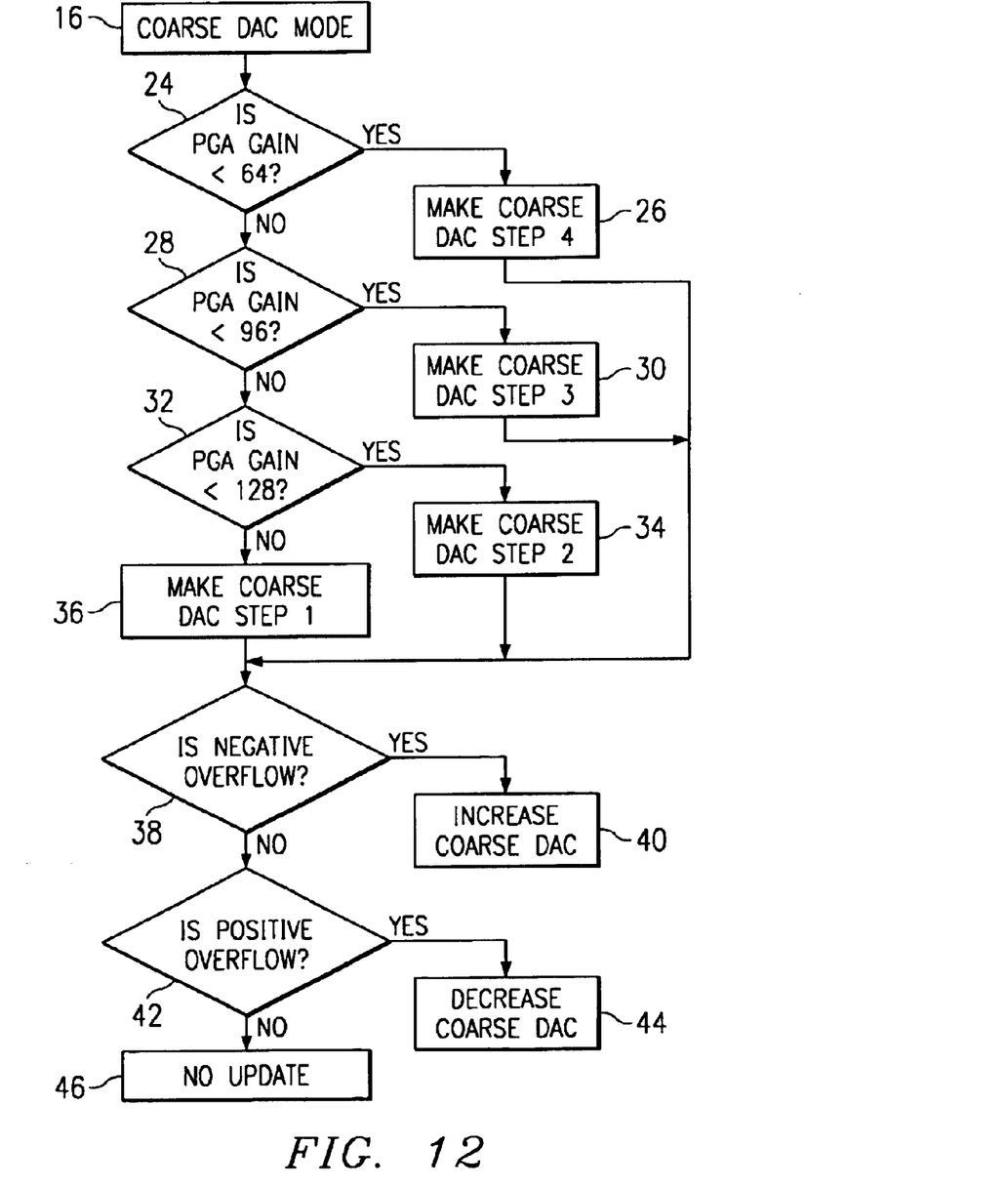
FIG. 12 is a flow chart for the coarse adjustment mode of the optical black offset correction apparatus as disclosed in the co-pending application Ser. No. 09/353,919.
Figure 13:
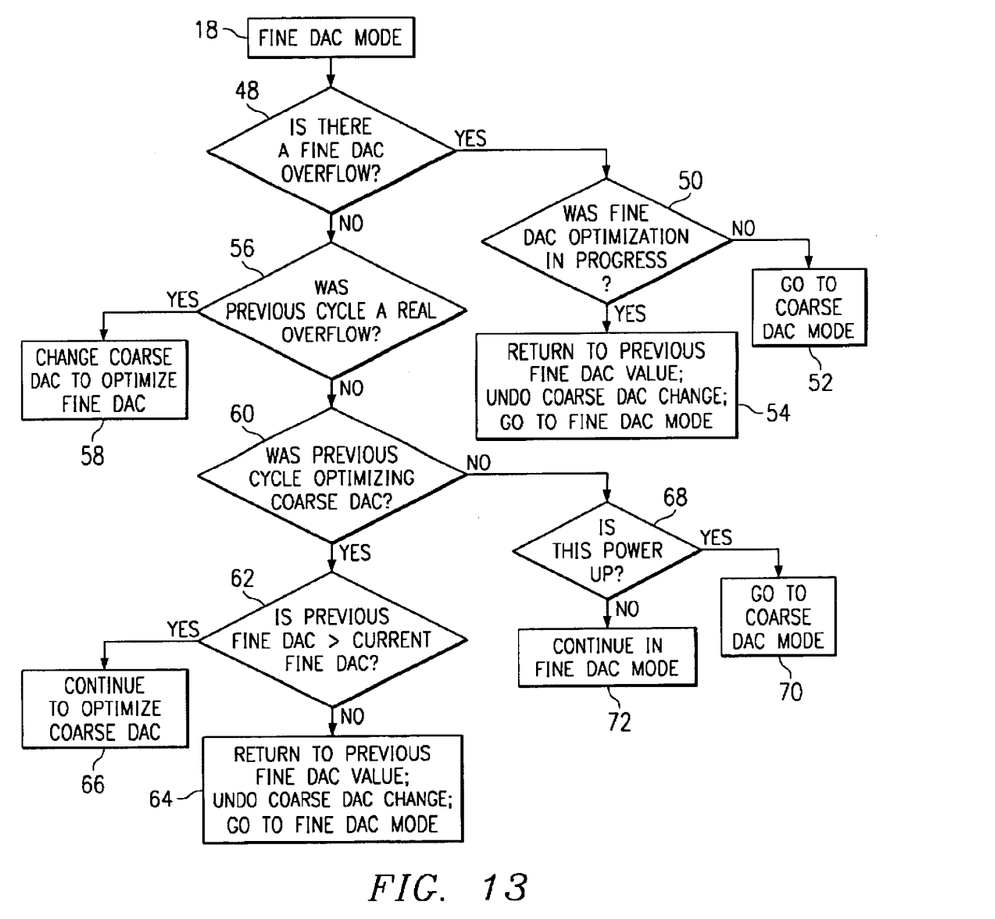
FIG. 13 is a flow chart for the fine adjustment mode of the optical black offset correction apparatus as disclosed in the co-pending application Ser. No. 09/353,919.

As shown in the flowcharts in FIGS. 11–13, if the offset is out of the range of the fine DAC 838, coarse DAC 836 is incremented or decremented depending on whether the offset is negative or positive. Once in the coarse mode, the system continues updating coarse DAC 836 until the output is closest to the desired value and the fine DAC 838 is at the center of its correction range. Afterwards, the remaining residue is corrected by the fine DAC 838. This way the range for the fine DAC 838 is optimized.

The coarse DAC 836 is in closed loop feedback for each line during optical black pixels. In coarse mode, it may take more than one repetition to correct the offset; but in fine mode offset is corrected immediately for each line. Relatively large optical level swings, close to +/−255 LSBs for an 8-bit Fine DAC 838, due to the optimization described above, can be corrected in fine mode without switching to coarse mode.

Specifically, as shown in FIG. 11, step 10 represents the output from the ADC 810 to the optical black pixel register 812. The user sets the optical black level as indicated in step 12 and optionally the gain in step 14. Accordingly, in step 16, these inputs are applied to the digital block such that it operates in a coarse mode, wherein a coarse optical black adjustment is made to the image signal from the CCD. Afterwards, in step 18, the digital block enters a fine mode wherein a fine optical black adjustment is made to the image signal. In step 20, it is determined whether the correction is still within the fine range. If so, the process proceeds back to step 18 such that the digital block remains in the fine mode. If not, step 16 is entered, such that the digital block operates in the coarse mode.

FIG. 12 illustrates the methodology of the coarse mode as indicated by step 16 of FIG. 11. The calibration logic 814 determines whether the gain is less than 64 in step 24. If so, as indicated by step 26, the coarse DAC 836 increments by four. If not, as indicated by step 28, the calibration logic 814 determines whether the gain is less than 96. If so, as shown in step 30, the coarse DAC 836 is incremented by 3. If not, the calibration logic 814 determines whether the gain is less than 128 as shown in step 32. Step 34 indicates, if so, the coarse DAC 836 is incremented by 2. Otherwise, as indicated by step 36, the coarse DAC 836 is incremented by 1.

After the coarse DAC 836 has been incremented, in step 38 it is determined whether there is a negative overflow. If so, as indicated by step 40, the coarse DAC 836 is incremented. If not, as indicated in step 42, it is determined whether there is a positive overflow. In such case, as shown in step 44, the coarse DAC 836 is decremented. If not, as step 46 indicates, no update is made to the coarse DAC 836.

FIG. 13 illustrates the methodology of the fine mode as indicated by step 18 of FIG. 11. It is first determined whether there is a Fine DAC 838 overflow in step 48. If there is an overflow, as indicated in step 50, the calibration logic determines whether the fine DAC 838 is being optimized. As shown in step 54, if so, the previous fine DAC value is used, the coarse DAC change is reversed and the Fine DAC mode is initiated again in step 18. If not, as indicated by step 52, the coarse DAC mode is entered (step 16). If there is no fine DAC overflow, as indicated by step 56, it is determined whether the previous cycle was a real overflow. If so the mode is changed to coarse DAC mode to optimize the fine DAC 838, as displayed in step 58. If not, it is determined whether the previous cycle was optimizing the coarse DAC 836 as shown in step 60. If so, as shown in step 62, it is determined where the previous fine DAC adjustment is greater than the current fine DAC adjustment. If it is, step 66 instructs the digital block to continue to optimized the coarse DAC 836. Otherwise, step 64 instructs the digital block to return to the previous Fine DAC adjustment value, undo the coarse DAC adjustment and return to the Fine DAC mode (step 18). If the previous cycle was not optimizing the coarse DAC 836, as indicated by step 68, the digital block determines whether circuit 800 has just powered up. If so, the coarse DAC mode (step 16) is initiated as step 70 indicates. Otherwise, the digital block continues in the Fine DAC mode (step 18) as shown in step 72.

Alternatively, another embodiment eliminates one of the two DACs 836,838, offset registers, 830 and 832, and multiplexers, 818 and 820 such that only one adjustment is made to the incoming analog image signal from the CCD. The first embodiment is more efficient in that it does not take an unknown number of repetitions of feedback lines to cancel the optical black level and produces more accurate optical black level.

Optional elements, DACs 826 and 828, DAC registers 822 and 824, PGA register 834 and serial port 816 are incorporated to provide the user with the ability to customize the optical black level and amplification, in addition to retrieve data for testing. As such, this highly programmable design can be used both in discrete and continuous time systems and does not require any off-chip components.

Figure 9:
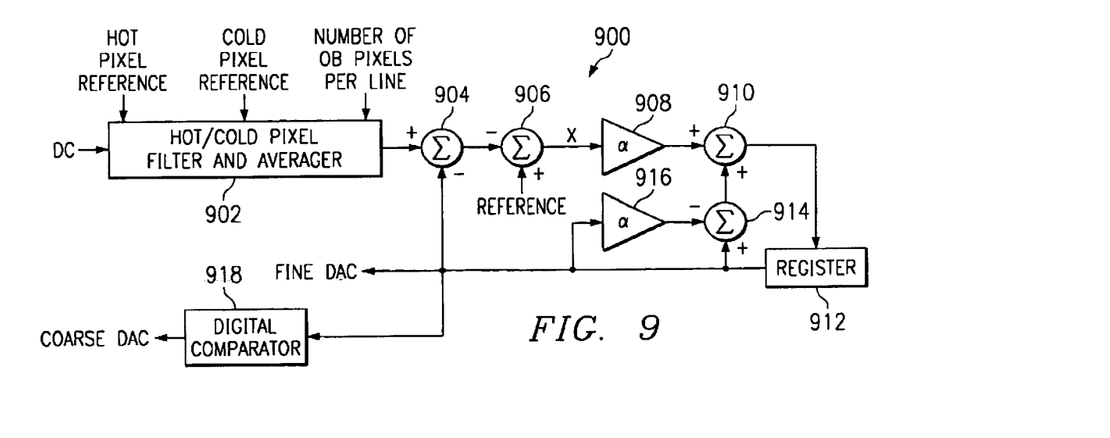
FIG. 9 illustrates the calibration logic for providing optical black and offset calibration and removing noise in accordance with the present invention.

The circuit 900, as displayed in FIG. 9, includes a line noise filtering scheme along with circuitry that eliminates hot and cold pixels. Circuit 900 is incorporated within calibration logic 814, excluding hot/cold pixel filter and averager 902 which is incorporated in optical black pixel limit reference 812. It includes a hot and cold pixel filter and averager 902 for the purpose of removing hot and cold pixels as well as averaging the optical black pixels at the beginning of each line. More particularly, this design 900 enables customizable hot and cold pixel reference levels as inputs to averager 902.

Figure 10:
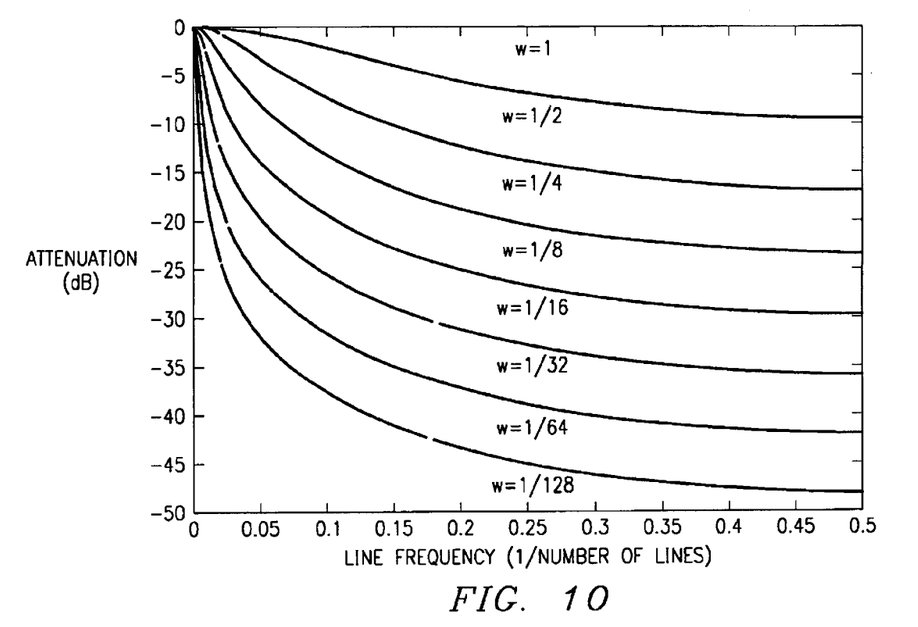
FIG. 10 illustrates an optical black filter response as a function of line frequency.

Since the optical black level shift is a slow signal, it is desired to remove high frequency components from the error signal in order to avoid line noise by applying over correction. The part of circuit 900 that cancels line noise approximates a moving average filter using a simplified function that only requires a few registers:

$$Y(n)=\alpha*X(n)+(1-\alpha)*Y(n-1)$$

where Y(n) is the new DAC value; X(n) is the error signal (the difference between the desired value and actual optical black level at the ADC output if correction DAC is zero); Y(n−1) is the previous DAC value; and α is the user programmable weight. This function is implemented using summers, 904, 906, 910, and 914, amplifiers, 908 and 916, and register 912. If α is 1, the correction is very fast which may cause line noise. If α is very small, response of the correction logic to the input error becomes slower but the over-correction of the high frequency components due to defective optical black pixels and noise are filtered out as is shown in FIG. 10.

The expected change in the optical black value during image read mode is very slow. However, this might not be the case at the start of each frame due to different exposure times. There might be a sudden optical black shift at the start of each frame. The user can set an internal control bit such that for the first line of the frame, optical black correction is done quickly, without any hot/cold pixel filtering and also setting weight, α, to 1 only for that line.

Once line noise has been removed, digital comparator 918 decides the adjustment (depending upon the PGA gain and coarse or fine mode as described in FIGS. 11–12) to the coarse DAC 836 as shown. Accordingly, signals, FineDAC and CoarseDAC, are sent to multiplexers, 818 and 820, respectively to provide fine and coarse adjustments to the analog image signal. During manual optical black correction mode multiplexers, 818 and 820, do not pass the auto correction values but pass the user set values to both DACs, 836 and 838.

Figure 14:
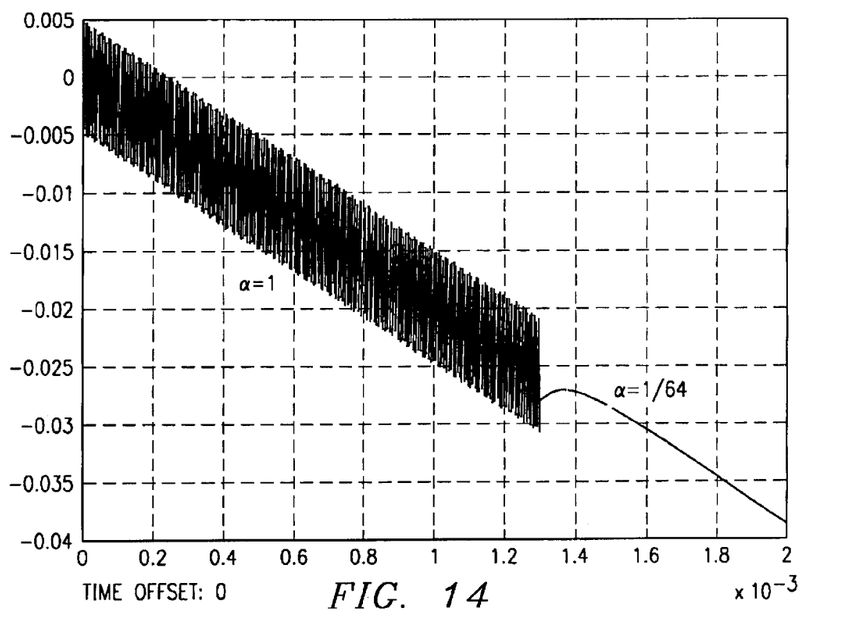
FIG. 14 illustrates the Fine DAC output for a low frequency ramp signal having a high frequency sine wave optical black noise having two different weight factors.
Figure 15:
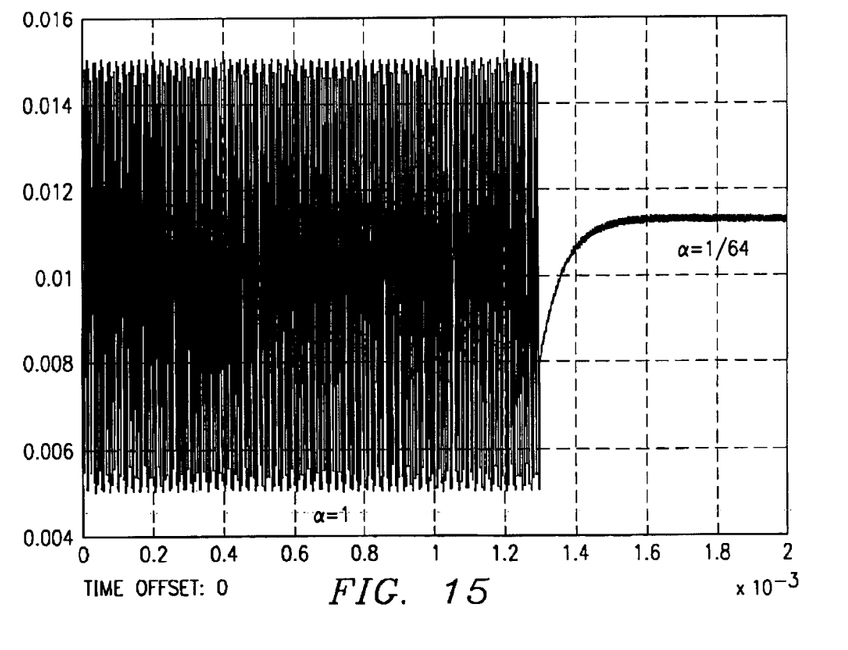
FIG. 15 illustrates the ADC output for a low frequency ramp signal having a high frequency sine wave optical black noise having two different weight factors.
Figure 16:
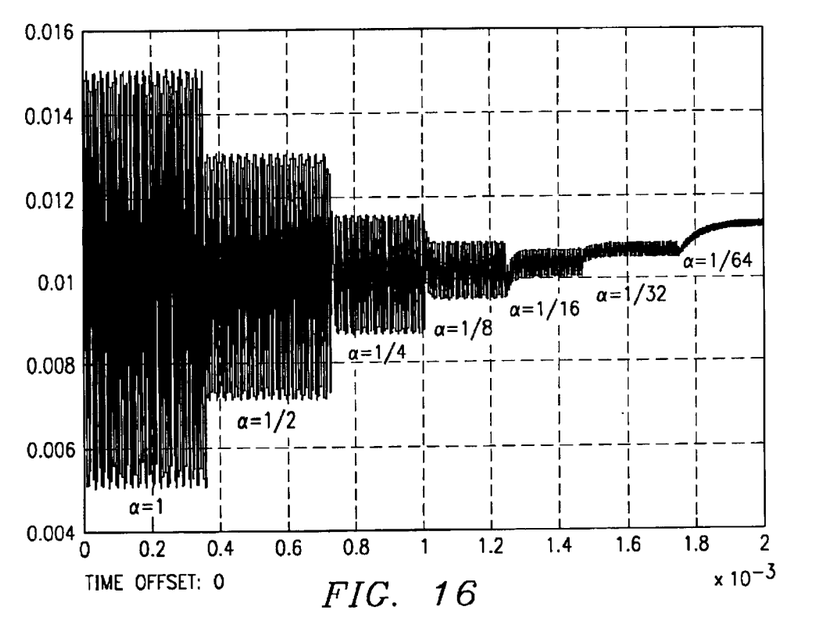
FIG. 16 illustrates the ADC output using different weight factors for α for a low frequency ramp signal having a high frequency sine wave optical black level.

FIG. 14–16 provide test results for circuit 900. In FIG. 14, the optical black input of a low frequency ramp signal having noise represented as a high frequency sine wave is filtered. As shown for the Fine DAC output 838, the high frequency component for the optical black noise is filtered out and the low frequency error signal is corrected. In FIG. 15, the same optical black input signal of a low frequency ramp signal having high frequency sine wave noise is shown at the output for ADC 810. As shown the high frequency noise has been eliminated by setting α=1/64. In FIG. 16, the same signal is featured looking at the output of the ADC 810 using different weight factors. As observed, the smaller the weight factor increases the quality of the image signal.

The advantages of the optical black correction apparatus includes but is not limited to a digitally programmable filter as opposed to an analog capacitor based integrator. Depending on the noise of the CCD, scan time, and other variables, the response time and filter bandwidth for the optical black correction can be digitally programmed. This architecture provides significant advantages over conventional architectures including digital programmability, fine resolution, and compatibility for both continuous time and discrete time programmable gain amplifiers.

The present invention finds application in a great many video systems including digital still cameras, digital video cameras, digital video processing systems, CCD signal processors, and CMOS imagers, in a variety of industrial, medical, and military sensor and imaging applications.

The reader's attention is directed to all papers and documents which are filed concurrently with this specification and which are open to public inspection with this specification, and the contents of all such papers and documents are incorporated herein by reference.

All the features disclosed in this specification (including any accompany claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. An image processing apparatus having offset and optical black correction circuit coupled to receive an optical black signal from a charge coupled device, comprising:

a sampling circuit for sampling the optical black signal at a predetermined reference voltage;

an analog-to-digital converter coupled to the sampling circuit for converting the sampled signal into a digital signal;

a detector circuit to detect the optical black level of the digital signal; a digital averager coupled to the detector circuit to average the optical black pixels at the beginning of each line of the optical black signal;

a line noise filter coupled to the digital averager to remove line noise from the optical black signal;

a digital comparator, having a predetermined reference, coupled to the line noise filter to compare the optical black signal from the line noise filter to the reference and generate a difference; and a correction circuit for correcting the optical black level by feeding back the difference obtained by the digital comparator such that the difference is added and subtracted to the analog optical black signal.

2. The apparatus having offset and optical black correction circuit as recited in claim 1, wherein the sampling circuit comprises a correlated double sampler; and an adder coupled to the correlated double sampler, wherein the correction circuit couples to the adder to add the positive and negative difference to the optical black signal.

3. The apparatus having offset and optical black correction circuit as recited in claim 2, wherein the sampling circuit further comprises a programmable gain amplifier coupled to the adder to amplify the sampled optical black signal.

4. The apparatus having offset and optical black correction circuit as recited in claim 3, wherein the sampling circuit further comprises a register coupled to the programmable gain amplifier to customize the value of amplification.

5. The apparatus having offset and optical black correction circuit as recited in claim 1, wherein the digital averager further comprises a first filter to remove hot and cold pixels from the optical black signal.

6. The apparatus having offset and optical black correction circuit as recited in claim 1, wherein the line noise filter applies the function:

$$Y(n)=\alpha*X(n)+(1-\alpha)*Y(n-1)$$

to the optical black signal, where Y(n) is the new digital-to-analog converter value; X(n) is the difference between the desired value and actual optical black level at the analog-to-digital converter output if correction digital-to-analog converter is zero, Y(n−1) is the previous digital-to-analog converter value, and a is the user programmable weight.

7. The apparatus having offset and optical black correction circuit as recited in claim 3, wherein the correction circuit comprises a first digital-to-analog converter coupled to the adder to apply the difference to the analog optical black signal.

8. The apparatus having offset and optical black correction circuit as recited in claim 7, wherein the correction circuit further comprises a second digital-to-analog converter coupled to the sampling circuit to apply the difference to the amplified analog image signal such that the first digital-to-analog converter being operable in a coarse mode wherein a coarse adjustment is made to the analog optical black signal prior to the second digital-to-analog converter being operable in a fine mode wherein a fine adjustment is made to the amplified analog optical black signal.

9. The apparatus having offset and optical black correction circuit as recited in claim 8, wherein the correction circuit further comprises a first and a second offset register coupled to the first and second digital-to-analog converters to customize the offset value for the optical black signal.

10. An image processing method comprising the steps of:

converting a signal of reflected light off of an object photoelectrically to obtain an optical black signal;

generating a predetermined reference voltage;

clamping the optical black signal to a predetermined reference voltage;

filtering out hot and cold optical black pixels;

detecting an optical black level of the clamped optical black signal;

filtering out line noise;

generating a difference between the optical black level detected with a predetermined optical black level;

switching between a coarse mode and a fine mode; and correcting the optical black level by feeding back the difference to the clamped optical black signal.

11. The method of claim 10, wherein the line noise filtering step applies the function:

$$Y(n)=\alpha*X(n)+(1-\alpha)*Y(n-1)$$

to the optical black signal, where Y(n) is the new digital-to-analog converter value; (n) is the difference between the desired value and actual optical black level at the analog-to-digital converter output if correction digital-to-analog converter is zero, Y(n−1) is the previous digital-to-analog converter value, and a is the user programmable weight.

* * * * *